(12) United States Patent
Buyukozturk et al.

(10) Patent No.: US 8,244,485 B2
(45) Date of Patent: Aug. 14, 2012

(54) SYSTEM AND METHOD FOR DETECTING DAMAGE, DEFECT, AND REINFORCEMENT IN FIBER REINFORCED POLYMER BONDED CONCRETE SYSTEMS USING FAR-FIELD RADAR (75) Inventors: Oral Buyukozturk, Chestnut Hill, MA (US); Tzu-Yang Yu, Cambridge, MA (US); Dennis Blejer, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/069,996

(22) Filed: Mar. 23, 2011

(65) Prior Publication Data
US 2011/0169687 A1    Jul. 14, 2011

Related U.S. Application Data (62) Division of application No. 12/127,376, filed on May 27, 2008, now Pat. No. 7,937,229.

(60) Provisional application No. 60/940,513, filed on May 29, 2007.

(51) Int. Cl.
*G01B 5/28* (2006.01)
(52) U.S. Cl. .......................................................... 702/40
(58) Field of Classification Search ..................... 702/40
See application file for complete search history.

(56) References Cited

U.S. PATENT DOCUMENTS

| 5,250,952 | A | * | 10/1993 | Roth | ............................ 342/25 F |
| 6,122,042 | A | | 9/2000 | Wunderman et al. | |
| 6,429,802 | B1 | | 8/2002 | Roberts | |
| 7,015,855 | B1 | * | 3/2006 | Medl et al. | .................. 342/25 A |
| 7,075,315 | B2 | | 7/2006 | Tanaka | |
| 7,190,177 | B2 | | 3/2007 | Zoughi et al. | |

* cited by examiner

*Primary Examiner* — Aditya Bhat
(74) *Attorney, Agent, or Firm* — Gesmer Updegrove LLP (57) ABSTRACT A non-contact, far-field radar nondestructive testing (NDT) method is disclosed that is capable of detecting at least one of defects, damages, and reinforcement conditions in near-surface region of multi-layer systems using monostatic inverse synthetic aperture radar (ISAR) measurements and applicable to various types of structural elements. The method includes the steps of conducting far-field monostatic ISAR measurements, executing an imaging algorithm, and executing a progressive image focusing algorithm.

6 Claims, 5 Drawing Sheets

SYSTEM AND METHOD FOR DETECTING DAMAGE, DEFECT, AND REINFORCEMENT IN FIBER REINFORCED POLYMER BONDED CONCRETE SYSTEMS USING FAR-FIELD RADAR

PRIORITY

The present application is a Divisional Application of Ser. No. 12/127,376, now U.S. Pat. 7,937,229, filed on May 27, 2008, that claims priority to U.S. Provisional Application No. 60/940,513, filed May 29, 2007, both of which are incorporated herein by reference in their entireties.

SPONSORSHIP INFORMATION

This invention was made with government support under grant number F19628-00-C-0002 awarded by the Air Force, and grant numbers CMS0239660 and CMS0324607 awarded by the National Science Foundation. The government has certain rights in this invention.

BACKGROUND

The present invention generally relates to systems and methods for non-destructive testing, and relates in particular to non-destructive testing systems and methods for use in testing fiber-reinforced polymer composite jacketing systems.

Fiber-reinforced polymer (FRP) composite jacketing systems have emerged as an alternative to traditional construction, strengthening, and repair of reinforced concrete columns and bridge piers. A large number of projects, both public and private, have used this technology and escalating deployment is expected, especially in seismically active regions.

Existing damages, however, in the interface vicinity, debonding of FRP from concrete, debonding between layers of a FRP wrap and those in overlap joints, may lead to catastrophic failures at loading stages earlier than those corresponding to intact specimens. Also, overlap joint length reduction due to progressive debonding during a seismic event may also be possible. Overlap joint failures have been reported in laboratory tests regardless of FRP configuration of the jacketing system. All of these failures may be associated with the onset of near-surface debonding within FRP layers or between FRP and concrete. Thus, near-surface debonding is used as a precursor for the damage detection in FRP-wrapped concrete columns.

Existing evaluation methods such as visual inspection and sample extraction/testing are labor intensive, time consuming, destructive to structures, and most importantly, unable to provide sufficient information about the extent of damage in structural members confined by FRP jackets. Concrete core conditions cannot be fully revealed until physical removal of the jacketing system unless the member has already been subjected to substantive damage. Partial or complete removal of the jacket may, however, pose a danger of structural collapse. A concrete column could appear safe without showing any sign of damage on the jacket and yet containing a substantial cracked or crumbled concrete core. Such scenario could happen when the structure has undergone a modest seismic event damaging the FRP/concrete system while not causing the ultimate failure of the system. That column may not live up to a second seismic event, however, because of the reduced resistance due to the existing invisible damage in the concrete and in concrete/FRP interface region.

To effectively detect and characterize concrete anomalies and FRP delamination, a NDE technique that is capable of detecting (1) the extent of concrete cracking, crumbling, and FRP delamination from concrete, (2) jacket debonding in the FRP-FRP interface, and (3) sizeable air pockets trapped between FRP and concrete during manufacturing is necessary. Currently, several NDE techniques have been under investigation. They include stress wave (acoustic), infrared thermography, x-ray, and radar (microwave) techniques. Acoustic, infrared thermography, and radar techniques have recently been of particular interest to researchers for possible damage assessment of reinforced concrete and FRP-bonded concrete structures in laboratory settings. In spite of studies of such techniques, there is no currently available technology capable of visualizing and characterizing various forms of FRP-bonded concrete damages that is ready for industrial applications.

Acoustic methods are based upon elastic wave propagation in solids. They include pulse-echo, impact-echo, ultrasonic, acoustic emission, and spectral analysis of surface waves (SASW) techniques. Disadvantages include the need of intimate contact between the equipment and subject, the use of sound compliant, as well as the existence of multiple paths through the same subject that make result interpretations difficult.

Infrared thermography is based on the detection of heat flow in the subject in which air gaps resulted from delamination act as insulators, which block out the proper heat flow. Data interpretation is, however, complicated because of varying ambient temperature conditions and surface emissivity variations, which is a function of surface properties.

Radiography Radiography-based evaluation methods use high frequency electromagnetic radiation (X-rays and Gamma rays) or particular beams (beta rays and neutron radiation) passing through the subject and exposing it onto a film on the other side of the subject. Limitations include the need to access both sides of the subject, the need of safety precautions, long exposure, and two-dimensional (2D) images of three-dimensional (3D) subjects.

Microwave and radar has been used for site characterization in geotechnical engineering, and have also been used to evaluate concrete structures, pavements, and bridge decks. Radar involves the generation and transmission of electromagnetic waves into materials such as concrete with different dielectric constants. Voids, delamination, rebars, and material characteristics can be detected and interpreted from the reflected waves. Optimization between penetration depths and detection capability, two inversely related parameters that are dependent on the frequencies and bandwidth of the wave, could be a challenge. Conventional radar typically makes use of low frequencies to enhance penetration but with sacrificed detectability.

There is a need, therefore, for a system and method for detecting damage, defects and reinforcement conditions in fiber reinforced concrete systems that avoids the above shortcomings.

SUMMARY

In accordance with an embodiment, the invention provides a non-contact, far-field radar nondestructive testing (NDT) method that is capable of detecting at least one of defects, damages, and reinforcement conditions in near-surface region of multi-layer systems using monostatic inverse synthetic aperture radar (ISAR) measurements and applicable to various types of structural elements, the method comprising the steps of conducting far-field monostatic ISAR measurements, executing an imaging algorithm, and executing a progressive image focusing algorithm. The invention provides, therefore, that with the proper development of wideband, multi-frequency capability and tomographic imaging techniques, along with measurement of dielectric properties of the subject materials, radar can be a powerful tool in assessing structural members that consist of hybrid materials.

In accordance with another embodiment, the invention provides a system for detecting, visualizing, and reporting the near-surface condition of a multi-layer system to provide lifecycle predictive and damage alert capabilities. The system includes: a) normal incidence means for detecting the surface response of the structure and one or more of its structural components at a far-field distance with signal collection devices configured in normal incidence scheme for ISAR measurements; b) oblique incidence means for detecting the surface response of the structure and one or more of its structural components at a far-field distance with signal collection devices configured in oblique incidence scheme for ISAR measurements; e) data collection means for data collection including one or more digital computers having a control program for acquiring and storing data from the detecting means and, and for optionally changing the operating characteristics of the normal incidence means and the oblique incidence means; d) processing means for processing structural responses collected by the normal incidence means and the oblique incidence means using tomographic reconstruction methods, said tomographic reconstruction methods further comprising a plurality of implementation algorithms for visualizing structural response for condition assessment; e) communicating means for communicating with the data collection means and processing means; and f) a numerical program implementing tomographic reconstruction methods that processes, visualizes, and displays imagery representing structural condition.

BRIEF DESCRIPTION OF THE DRAWINGS

The following description may be further understood with reference to the accompanying drawings in which.

The drawings are shown for illustrative purposes only.

DETAILED DESCRIPTION

Systems and methods in accordance with various embodiments of the present invention provide an non-destructive testing NDT capability that is practically applicable to assess the condition of FRP-retrofitted concrete structures at a distance more than 10 meters, rather than the contact or near-contact NDT techniques requiring inspection distance less than 0.5 meter. This radar NDT technique combines ISAR measurements and data processing (image reconstruction and focusing) to better assess the presence of defects and damages in the structure.

In accordance with an embodiment, the invention provides a non-contact, far-field radar NDT method capable of detecting (1) FRP (fiber reinforced polymer) delamination, (2) FRP debonding from concrete substrate, (3) sizeable air pockets trapped between FRP sheets and concrete substrate during manufacturing, and (4) the extent of concrete cracking and crumbling in near-surface region of reinforced concrete (RC), prestressed concrete (PC), concrete/steel composite, and masonry structures wrapped and/or bonded with fiber reinforced polymer (FRP) sheets/plates, using monostatic inverse synthetic aperture radar (ISAR) measurements. The structures mentioned above are generally provided as a multi-layer system.

High-frequency continuous waves that are mutually time harmonic in the range of 8 GHz to 18 GHz are used as incident signals. The system and method is especially effective for glass FRP (GFRP) wrapped/bonded concrete systems. One or more electronic signals, varying in amplitude and phase, are reflected from the FRP-bonded concrete structure and collected by radar antenna in the far-field region, which represent the electromagnetic response of the structure. In the apparatus of this method two measurements schemes are defined; normal incidence and oblique incidence.

Information regarding the presence and location of anomaly is utilized for routine maintenance, as well as for special purpose safety assessment, of FRP-retrofitted concrete, reinforced concrete, pre-stressed concrete, concrete/steel composites, and masonry elements including bridges, buildings, and walls, as well as masonry walls strengthened by FRP sheets. This information is also beneficial to the management of civil infrastructures in the way resources for repair and rehabilitation can be effectively allocated.

Figure 1A:
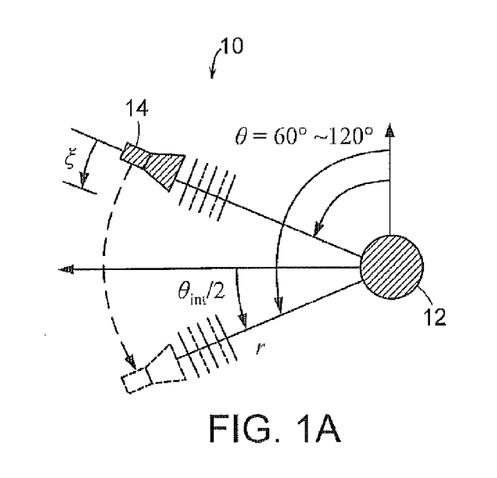
FIGS. 1A and 1B show illustrative diagrammatic top and side views of a system in accordance with an embodiment of the invention that provides normal incidence detection.
Figure 1B:
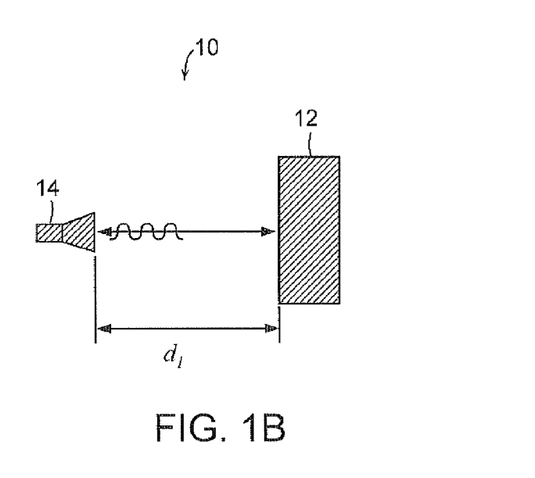

FIG. 1A shows a top view of a system 10 that provides normal incidence detection of an FRP-concrete structure 12 using a horn antenna 14 that is moved over an angle θ as shown. FIG. 1B shows a side view of the system of FIG. 1A, and shows that the distance $d_1$ between the horn antenna 14 and the FRP-concrete structure 12 is a far-field distance. In a normal incidence scheme, the specular return effect dominates the reflection response at all azimuth angles (for all angles θ). The strong effect of specular return is utilized for reinforcement detection in this method.

Figure 2A:
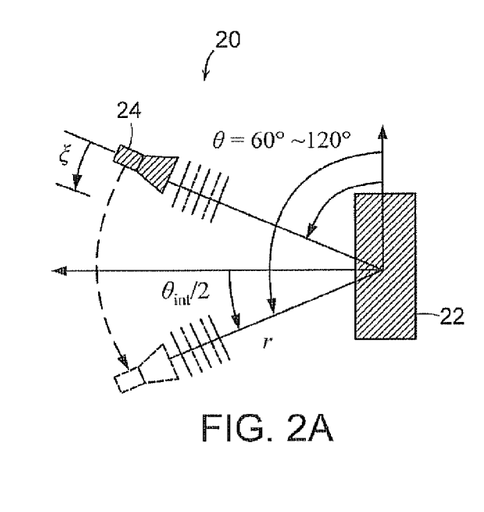
FIGS. 2A and 2B show illustrative diagrammatic top and side views of a system in accordance with another embodiment of the invention that provides oblique incidence detection.
Figure 2B:
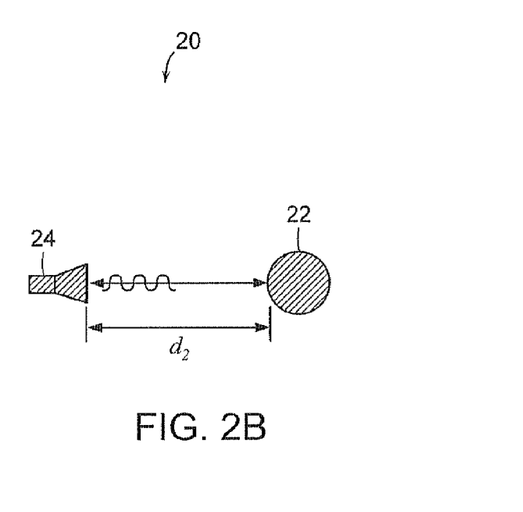

FIG. 2A shows a top view of a system 20 that provides oblique incidence detection of an FRP-concrete structure 22 using a horn antenna 24 that is moved over an angle ø as shown. FIG. 2B shows a side view of the system of FIG. 2A, and shows that the distance $d_2$ between the horn antenna 24 and the FRP-concrete structure 22 is a far-field distance. In such an oblique incidence scheme, specular return is only significant when ø equal 90°. The alleviation of specular return in an oblique incidence scheme provides an opportunity of discovering near-surface defects/damages in the multi-layer system.

Figure 3:
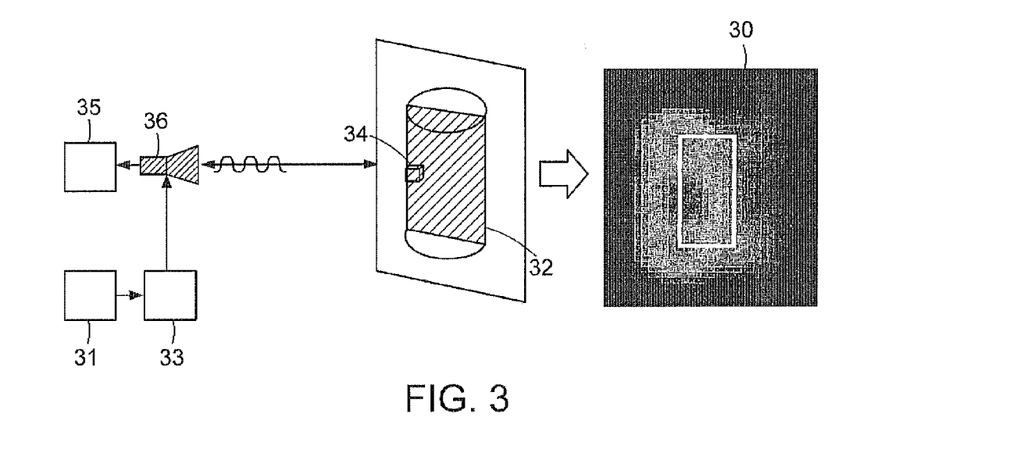
FIG. 3 shows an illustrative diagrammatic view of a reconstructed image using oblique incidence ISAR measurement of a glass fiber reinforced polymer (GFRP) concrete cylinder specimen with a cubic defect in the middle section.
Figure 4:
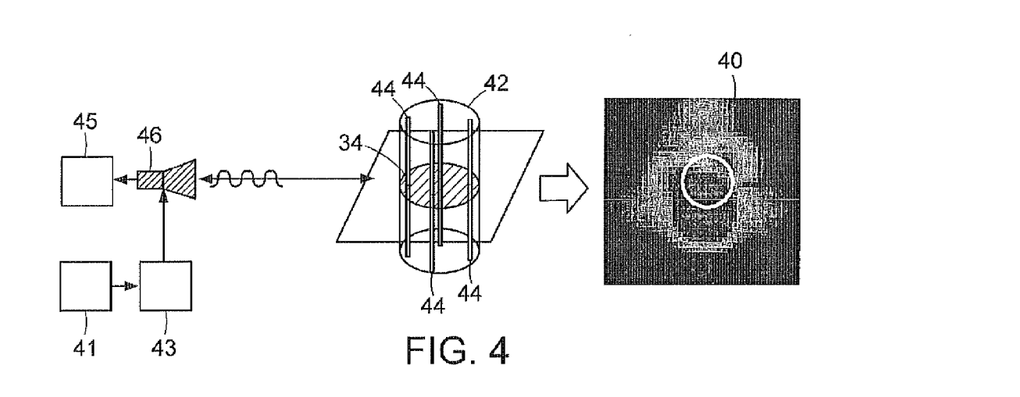
FIG. 4 shows an illustrative diagrammatic view of a reconstructed image using normal incidence ISAR measurements of a concrete cylinder with four rebars.

In an image reconstruction algorithm, the far-field wide-bandwidth ISAR measurements are processed to render a spatial profile of the structure in the incident plane of the signals. The presence of anomalies (defects, damages, and rebars) are detected and represented by scattering signals in the reconstructed images. For example, FIG. 3 shows an illustrative diagrammatic view of a reconstructed image 30 using oblique incidence ISAR measurement of a glass fiber reinforced polymer (GFRP) concrete cylinder specimen 32 having a cubic defect 34 in the middle section. A horn antenna 36 is directed toward the specimen 32 as shown. FIG. 4 shows an illustrative diagrammatic view of a reconstructed image 40 using normal incidence ISAR measurements of a concrete cylinder 42 having four rebars 44. A horn antenna 46 is directed toward the specimen 42 as shown. The locations of anomalies may be determined from the images 30 and 40.

A progressive image focusing scheme is developed to numerically improve the resolution by integrating ISAR measurements over a range of frequency and azimuth angle. Image resolution is improved by increasing the amount of measurements, rather than sacrificing inspection convenience by shortening the inspection range.

A far-field airborne radar technique of the invention includes an airborne horn antenna 36, 46, a signal generator 31, 41, a signal modulator 33, 43, and an analyzer 35, 45 as also shown in FIGS. 3 and 4. The reconstructed images 30 and 40 are provided by the analyzers 35, 45 respectively. In principle, modulated radar signals or EM waves are designed and generated by the signal generator, modulated by the modulator, and transmitted by the horn antenna. The horn antenna is placed beyond the far-field distance from the target structure. Hence the impinging EM waves on the structure will be essentially plane waves. Far-field measurement allows inspections from distance for highway and cross-river bridge columns. Furthermore, the waveform is mathematically simplified for signal processing. The far-field distance will be explained in the later part of this section.

Reflected EM waves or radar signals are collected by the same horn antenna and processed by the analyzer. The radar measurements are collected in inverse (or circular) synthetic aperture radar (ISAR) mode; in other words, the reflected signals are received at different angles with respect to the structure. Image processing algorithms are then applied for processing the reflected signals and for forming the imagery as a basis for condition assessment. In this section, important radar parameters including pulse width and bandwidth, range and cross-range resolutions, polarization, and radar cross section (RCS) are first introduced. The difference between near-field and far-field is also defined.

A linear frequency modulated waveform generated by radar consists of a rectangular pulse of duration $T=t_2-t_1$. The carrier frequency f is swept over the pulse length by an amount B which represents the bandwidth. For the case of a modulated pulse length similar to T, the swept bandwidth and the achievable pulse are related by T is approximately equal to $1/(f_1-f_2)$, which equals $1/B$ where $f_1$ and $f_2$ are the starting and ending frequencies respectively.

Range resolution is defined on the radial (or range) distance from the radar to the target and is obtained from the transmitted signal. Cross-range resolution is related to the resolution perpendicular to the radial direction, and it is obtained by integrating the reflected energy from the target medium as the radar sweeps alongside the area of illumination.

Polarization is defined as the variations of the orientation of electric field with respect to time. Considering that the target under test is an infinite cylinder (treated as a two-dimensional structure), the incident field is referred to as VV-polarized or TM (transverse magnetic) when the electric field is parallel to the axis (infinite dimension) of the cylinder. The other polarization is referred to as HH polarized or TE (transverse electric) when the electric field is perpendicular to such axis. In the two mentioned polarization options, if the orientation of the electric field does not change with increasing distance, then they are termed linear polarizations. Circular polarization, on the hand, allows for the electric and magnetic field orientations to rotate about the direction of propagation with increasing distance. The availability of the HH and VV polarizations is a key advantage of radar methodologies for NDE applications on anisotropic materials whose properties are dependent on the direction of measurement.

Estimation of the signal strength received by a radar receiver requires the knowledge of the signal strength decay of transmitting waves, the response of reflected waves by a remote obstacle, and the dispersion of the reflected waves by the obstacle. A single function σ, referred to as radar cross section (RCS) characterizes the obstacle reflection. By its definition, RCS provides information about the target's characteristics and removes the effects of the transmitted power, receiver sensitivity, and the relative distance between the transmitter and receiver Antenna patterns vary in shape depending on the distance from the antenna, noted as R, and with the angular direction (polar distribution). In the case of a large distance from the antenna, the shape of the radiation pattern over a sphere of constant radius is independent of R. This distance or the Rayleigh distance is characterized and determined by the far-field condition. Distances satisfying the far-field condition form the far-field region. On the other hand, distances satisfying the near-field condition constitute the near-field region. In diffraction optics, the near-field is called the Fresnel region, and the far-field is called the Fraunhofer region. A common accepted far-field condition with $\lambda 16$ wave front error at the far-field distance is $R \geq 2D^2/\lambda$ where D=diameter of the smallest sphere that completely contains the antenna, and λ=smallest wavelength of the transmitted wave. The far-field distance is found when this equation is maintained. Range distances greater than the far-field distance are generally considered in the far-field region.

Figure 5:
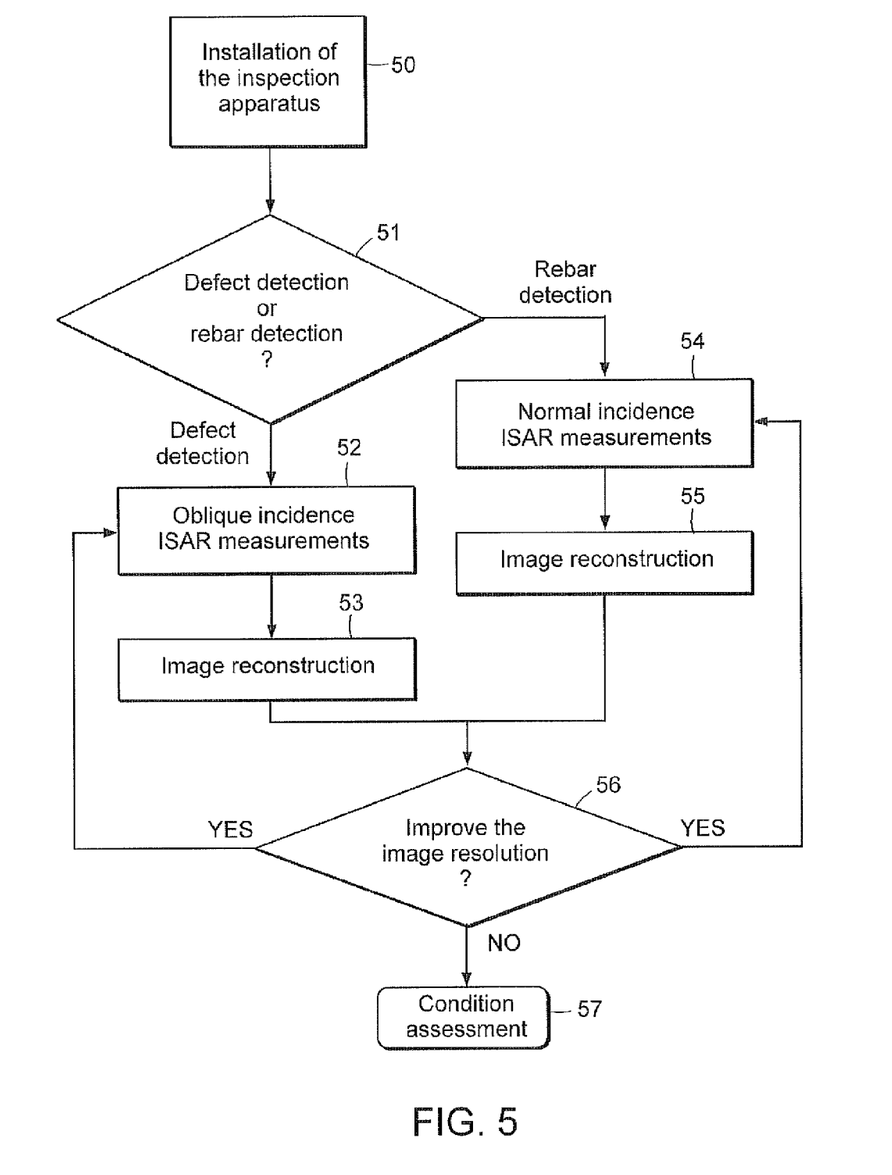
FIG. 5 shows an illustrative flow chart of a process in accordance with an embodiment of the invention.

As shown in FIG. 5, a process of operation of a system in accordance with an embodiment of the invention may first provide installation of an inspection apparatus (step 50), and then determine whether one of a defect or rebar is detected (step 51). If a defect is detected, the process first performs an oblique incidence ISAR measurement (step 52) and then provides an image reconstruction (step 53). If a rebard is detected, the process performs a normal incidence ISAR measurement (step 54) and then provides an image reconstruction (step 55). Following image reconstruction, the process then determines whether or not image resolution needs to be improved (step 56). If not, the process ends with a condition assessment (step 57). If image resolution needs to be improved and a defect was detected, the process returns (as shown at 58) to the step (52) of performing oblique incidence ISAR measurements. If image resolution needs to be improved and a rebar was detected, the process returns (as shown at 59) to the step (54) of performing normal incidence ISAR measurements Radar measurements of GFRP-confined concrete specimens were performed as follows. The experimental set-up consisted of a horn antenna, stepped-frequency radar and network analyzer systems, and a Harris Dual-Shaped reflection system, Model 1606, designed for conducting far-field studies. The facility can achieve high signal-to-noise ratio measurements for a large frequency bandwidth ranging from UHF (0.7 GHz) to 100 GHz. This radar system is capable of producing a 20-m quiet zone, different antenna radiation patterns, and full polarimetric RCS measurements. Specimens are placed on top of a Styrofoam tower that is capable of fully rotating the target at predetermined angular steps. The measurements were conducted in stepped-frequency mode by sweeping from a starting frequency $f_1$ to an end frequency $f_2$ in 0.02 GHz increments at a fixed angle. The target is then rotated to the next angular step and the frequency sweeping is again performed.

Radar measurements were conducted at X- and Ku-band frequencies (8-12 and 12-18 GHz, respectively) to achieve optimized resolution and surface penetration capabilities. The range resolution is directly related to the bandwidth of radar signals. For X- and Ku-bands whose bandwidths are 4 and 6 GHz respectively, the corresponding range resolutions in free-space are 38 mm and 25 min. The total rotation angle is 60° in the ISAR measurements and angular increments are 0.1° and 0.2°. Two types of polarizations were used in the radar measurements: HH-polarization and VV-polarization. These measurements were collected in the far-field condition.

While the resolution achieved in the radar measurements is significantly high, the trade-off is evident in terms of penetration capabilities. Using the definition of penetration depth for a non-magnetic, dielectric material, the penetration depth is controlled by the permittivity of the material and the measurement frequency. When dielectric losses occur in the material due to conduction currents, the equivalent conductivity $\sigma$ is expressed as: $\sigma = \acute{\in}_r \in_0 \omega$ where $\acute{\in}_r$ is the imaginary part of the complex permittivity, $\in_0$ is the permittivity in air (free space), and $\omega$ is the angular frequency.

The determined dielectric constant and loss factor using the proposed dielectric property characterization methodology for concrete are 5.69 and 0.62, respectively. The estimated penetration depths are approximately 50 mm and 22 mm for 8 and 18 GHz frequencies, respectively. Although the use of high frequency radar waves results in shallow penetration depths, the proposed X and Ku-bands were originally selected in view of the need to detect near-surface defects, FRP-concrete delaminations, and mechanical damage in the concrete regions close to the FRP jacket.

Two artificially damaged GFRP-wrapped concrete cylinder specimens were prepared for physical radar measurements. Artificial damages were introduced by insertion of Styrofoam elements (whose dielectric properties are same as air) on the surface of concrete cylinders, representing construction defect and GFRP delamination. The artificially damaged concrete specimens were then wrapped by GFRP sheet which adhered to concrete with epoxy. The average 28-day strength of the concrete was 26 MPa. The water-to-cement ratio was 0.6. The ongoing measurement activity includes GFRP-concrete specimens which are mechanically damaged at different stages.

For radar measurements, the specimens under investigation were placed on top of a Styrofoam tower in two alternative orientations: 1) having the specimen rest on one of its ends, referred to as vertical position, and 2) having the specimen rest on its side, referred to as horizontal position. For the specimen with vertical orientation the angle of incidence θ is at 90° with the z-axis, thus the corresponding radar measurements are always made at normal incidence as the specimen is rotated around its axis. In the oblique incidence scheme, the angle of incidence φ varies as the specimen rotates around the y-axis. Normal incidence is encountered only when the direction of incident waves and the axis of the specimen are perpendicular to each other. For all other incidences, the incident wave meets the specimen in an oblique fashion. Both measurement schemes were designed to capture different EM wave scattering behaviors, and consequently investigate their effectiveness when the far-field radar technique is applied for damage or defect detection in GFRP-confined concrete elements.

The radar measurements were collected in ISAR mode, and they consisted of HH and VV polarization measurements as functions of frequency at fixed incident angles. For each polarization, an amplitude entry and a phase entry were recorded at each frequency step. Measurement results are processed and rendered in frequency vs. angle imagery. Measurements showed the far-field radar measurements in HH polarization at X-band from intact (without defect) and damaged (with defect) surfaces of the specimen CYL02 using normal incidence scheme. Measurements also showed the normal incidence measurements at Ku-band also from the specimen CYL02, as well as oblique incidence measurements from the specimen CYL02 at Xband. The normal and oblique incidence measurements from the specimen CYLAD2 at X-band were compared.

From the normal incidence measurements it is found that a weak power response area was observed at 90° in the image of damaged surface at X-band, where the artificial defect is embedded underneath the GFRP layer. Since the defect region is consisted of Styrofoam whose dielectric constant is smaller than concrete, the reflection response obtained from the defect region is weaker than the one from intact regions. This weak response area suggests the presence of the defect in that location (90°). Such area is also found in the image of higher frequency ranges (Ku-band). However, in this case, due to the specular effect, the difference in the power responses between intact and damaged regions is not constantly significant. Surface condition of the specimen, such as roughness, affects the power measurement in higher frequency ranges, especially for reflection signals.

To avoid the specular effect, oblique incidence was adopted. The comparison between the responses of intact and damaged surfaces gives a clear indication on the presence of the defect, especially at angles in the vicinity of normal incidence (specular response).

Comparing the normal incidence responses of specimens CYL02 and CYLAD2 it is found that the observed weak response area in cannot be clearly identified, although an area with rough boundary was observed in the relatively lower frequency ranges. Oblique incidence measurements clearly indicate the presence of the defect.

With this flexibility in signal processing, different purposes of inspection can be chosen with respect to desired resolution. The present embodiment pertains to a NUT system and method for inspecting and visualizing the near-surface condition of reinforced concrete (Re) structures wrapped/retrofitted with fiber reinforced polymer (FRP) sheets. Two measurement schemes of the invention are illustrated in FIG. 1. FIG. 4 shows the overview and procedure of the method. The operation modes of the invention are diagrammatically illustrated in FIG. 5-8.

In accordance with an embodiment, a system of the invention includes a far-field monostatic ISAR inspection with two measurement schemes, and a data processing algorithm. Instrumentation of the invention mainly consists of an airborne horn antenna, a signal generator, a signal modulator, and an analyzer. In principle, modulated radar signals or EM waves are designed and generated by the signal generator, modulated by the modulator, and transmitted by the horn antenna. The horn antenna can be placed beyond the far-field distance from the target structure. Far-field measurement allows convenient inspections from distance for highway and cross-river bridge columns. The inspection is conducted by deploying a radar horn antenna, sending radar signals by the antenna, and collecting the reflected radar signals (responses, measurements) by the same antenna.

For the far-field monostatic ISAR inspection, an airborne horn antenna is configured in normal incidence or oblique incidence measurement scheme (FIG. 1). Coherent reflection responses are collected at different frequencies and azimuth angles in ISAR mode to form the frequency-angle data. The frequency range 8~18 GHz is investigated for its features and abilities in assessing the unseen damages and defects hidden behind the FRP sheets in the interface region between FRP sheets and concrete substrate. The standoff or inspection distance, depending on the aperture size of the antenna, can be practically as far as 10 meters and more in the chosen measurement frequency range, enabling a real distant inspection capability.

The frequency-angle data is then processed by an image reconstruction algorithm which is based on tomographic reconstruction methods to generate range-cross-range imagery for visualization. Spatial profile of the inspected structure is characterized by the range-cross-range imagery in which geometric features of the structure and unseen near-surface defects are revealed by scattering signals. Image resolution is in general proportional to (a) the frequency bandwidth and (b) the range of azimuth angle.

A method of an embodiment of the invention, therefore, includes, normal and oblique incidence schemes, a data processing algorithm, and progressive image focusing. The normal and oblique incidence schemes provide that the signal transmitter and receiver may operate in two schemes for measuring the reflection response of the target structure; normal and oblique incidence schemes. Distant (near-field and far-field) measurements conducted in these schemes construct the frequency-angle data.

The data processing algorithm provides that the measured frequency-angle data are processed by tomographic reconstruction methods. The spatial profile of the structure is characterized by the range-cross-range imagery, and is used for condition assessment.

The progressive image focusing provides that image resolution is progressively improved by assembling all sub-aperture images in this technique. The spatial profile of the structure can be first reconstructed by using the data in one sub-aperture for preliminary evaluation. The resolution of imagery can be enhanced finishing all planned frequency bandwidth and the range of azimuth angle. This computational focusing scheme enables the technique to be used in different purposes, such as preliminary inspection and detailed inspection.

The integration of two measurement schemes (normal and oblique) in ISAR mode together with data processing algorithm (tomographic reconstruction) enables the inspector to visualize the near-surface condition of multi-layer systems from the reflected radar signals collected in a distance more than 10 meters form the inspected structure.

Figure 6:
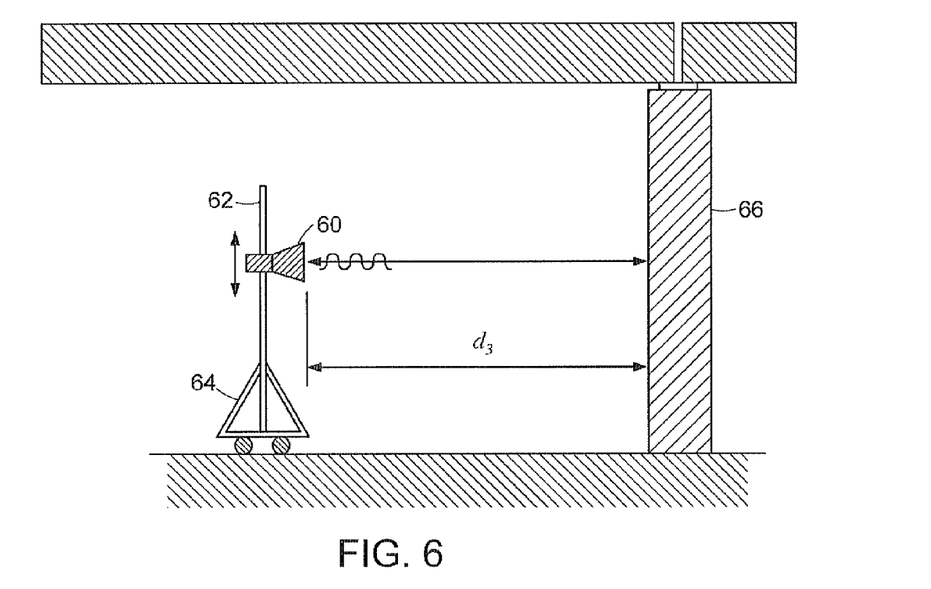
FIG. 6 shows a diagrammatic illustrative side view of a system in accordance with an embodiment of the invention in which a normal incidence scheme is employed on a column-type or wall-type structural element.

In-field inspection using systems and methods of the invention may be conducted as generally shown, for example, in FIGS. 6-9. FIG. 6 shows a side view of a system in accordance with an embodiment of the invention in which a normal incidence scheme is employed on a column-type or wall-type structural element. In particular, the system of FIG. 6 includes a horn antenna 60 that is movable mounted on a frame 62 such that the vertical position of the horn antenna 60 may be controllably adjusted. The frame 62 may also be mounted on a movable base 64. The antenna 60 is positioned a distance $d_3$ from a subject wall 66 to be interrogated, and the distance $d_3$ is a far field distance. This measurement scheme is configured by setting a controllable frame for adjusting the vertical position of the radar horn antenna while maintaining a constant far-field distance for measurements at different azimuth angles and frequencies.

Figure 7:
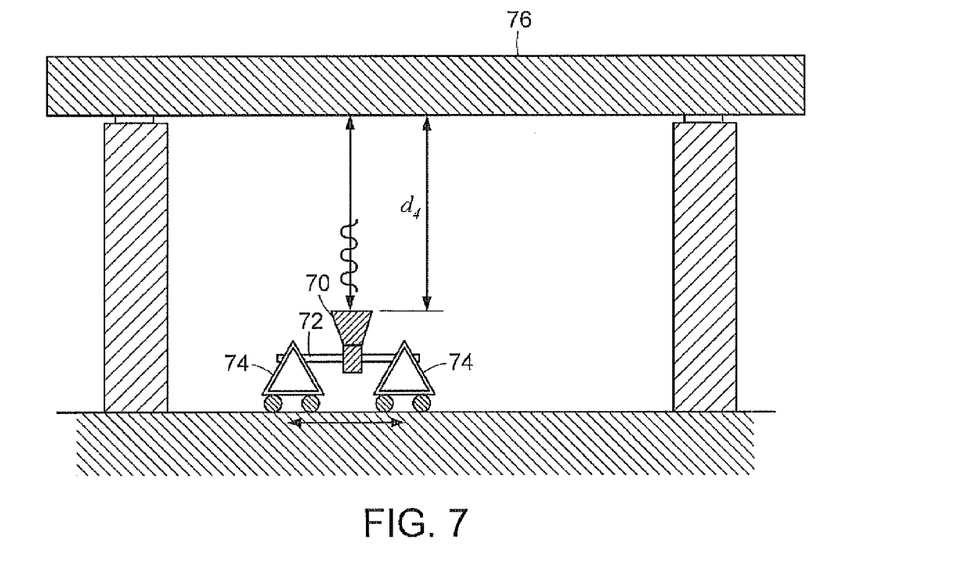
FIG. 7 shows a diagrammatic illustrative side view of a system in accordance with another embodiment of the invention in which a normal incidence scheme is employed on a beam-type structural element.

FIG. 7 shows a diagrammatic illustrative side view of a system in accordance with another embodiment of the invention in which a normal incidence scheme is employed on a beam-type structural element. The system of FIG. 7 includes a horn antenna 70 that is movable mounted on a frame 72 such that the horizontal position of the horn antenna 70 may be controllably adjusted. The frame 72 may also be mounted on a movable base 74. The antenna 70 is positioned a distance $d_4$ from a subject ceiling 76 to be interrogated, and the distance $d_4$ is a far field distance. This measurement scheme is configured by setting a controllable frame for adjusting the horizontal position of the radar horn antenna while maintaining a constant far-field distance for measurements at different azimuth angles and frequencies.

Figure 8:
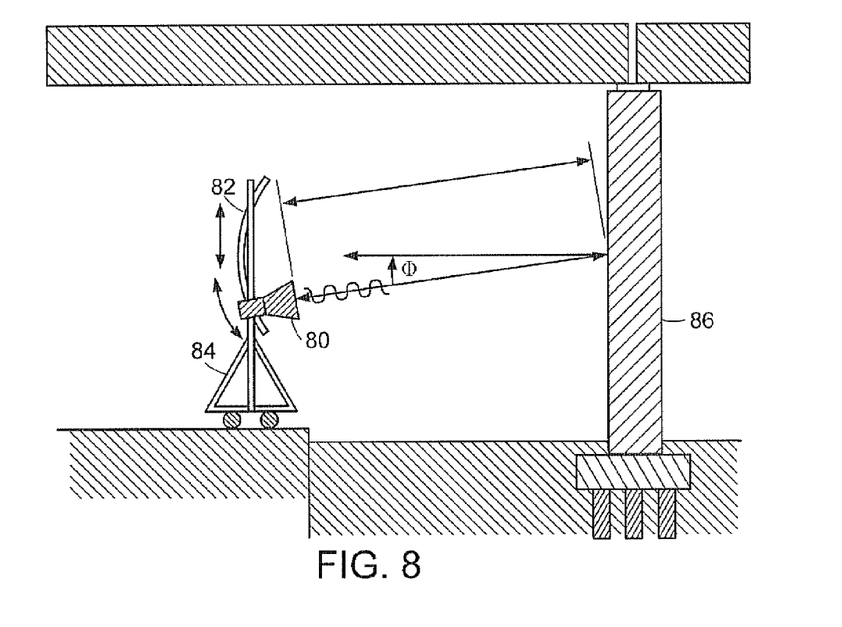
FIG. 8 shows a diagrammatic illustrative side view of a system in accordance with a further embodiment of the invention in which a oblique incidence scheme is employed on a column-type or wall-type structural element.

FIG. 8 shows a diagrammatic illustrative side view of a system in accordance with a further embodiment of the invention in which a oblique incidence scheme is employed on a column-type or wall-type structural element. The system of FIG. 8 includes a horn antenna 80 that is movable mounted on an arced frame 82 such that the angular position of the horn antenna 80 may be controllably adjusted. The frame 82 may also be mounted on a movable base 84. The antenna 80 is positioned a distance $d_5$ from a subject wall 86 to be interrogated, and the distance $d_5$ is a far field distance. This measurement scheme is configured by setting a controllable frame for adjusting the angular position of the radar horn antenna while maintaining a constant far-field distance for measurements at different azimuth angles and frequencies.

Figure 9:
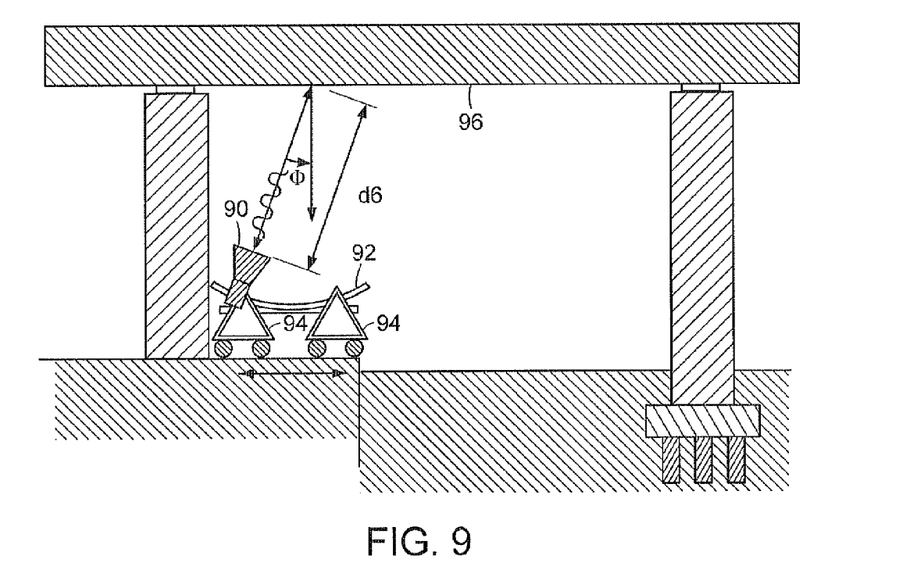
FIG. 9 shows a diagrammatic illustrative side view of a system in accordance with further embodiment of the invention in which a oblique incidence scheme is employed on a beam-type structural element.

FIG. 9 shows a diagrammatic illustrative side view of a system in accordance with further embodiment of the invention in which a oblique incidence scheme is employed on a beam-type structural element. The system of FIG. 9 includes a horn antenna 90 that is movable mounted on an arced frame 92 such that the angular position of the horn antenna 90 may be controllably adjusted. The frame 92 may also be mounted on a movable base 94. The antenna 90 is positioned a distance $d_6$ from a subject ceiling 96 to be interrogated, and the distance $d_6$ is a far field distance. This measurement scheme is configured by setting a controllable frame for adjusting the angular position of the radar horn antenna while maintaining a constant far-field distance for measurements at different azimuth angles and frequencies.

A far-field airborne radar (FAR) NDE technique is provided therefore, that addresses the damage detection in the surface region of GFRP-wrapped concrete structures is proposed. To validate the feasibility of the technique physical radar measurements and numerical simulations were performed. Physical radar measurements on GFRP wrapped concrete cylinder specimens with artificially introduced air voids and de-lamination behind the GFRP layer were collected at X- and Ku-bands in a compact/radar cross section antenna facility. The radar antenna operated in inverse synthetic aperture radar (ISAR) mode providing reflection measurements at different angles. Two measurement schemes, normal incidence and oblique incidence, were investigated.

It was found that in the normal incidence measurements, due to the specular effect, the difference in the power responses between intact and damaged regions is not constantly significant. On the other hand, the oblique incidence measurements provide a clear indication on the presence of the defect in the frequency-angle imagery. Measurements at oblique incidence provided superior damage indication than those at normal incidence case, regardless of wave polarization and the thickness of the defect. Surface condition of the specimen such as roughness, affects the reflected power measurements in higher frequency ranges (Ku-band), suggesting the importance of data de-noising and filtering.

In accordance with various embodiments, therefore, the invention provides a non-contact, far-field radar nondestructive testing (NDT) method that is capable of detecting defects/damages and reinforcement in near-surface region of multi-layer systems using monostatic inverse synthetic aperture radar (ISAR) measurements and applicable to various types of structural elements, wherein the method includes (a) far-field monostatic ISAR measurements, (b) imaging algorithm, and (c) progressive image focusing scheme. The "defects/damages" may include (a) FRP delamination, (b) FRP debonding from concrete substrate, (c) sizeable air pockets trapped between FRP sheets and concrete substrate during manufacturing, and (d) the extent of concrete cracking and crumbling. The "multi-layer systems" may include (a) reinforced concrete (RC), (b) prestressed concrete (PC), (c) concrete/steel composite, and (d) masonry structures wrapped and/or bonded with fiber reinforced polymer (FRP) sheets/plates. The "monostatic inverse synthetic aperture radar (ISAR) measurements" may include the far-field and/or near-field radar measurements collected with coinciding transmitter and receiver in (a) normal incidence scheme, and (b) oblique incidence scheme. The "imaging algorithm" may include the tomographic reconstruction and backprojection algorithm. The "progressive image focusing scheme" may include the signal processing with increasing frequency ranges and azimuth ranges to render reconstructed images with improved resolution. The "structural elements" may include (a) bridge pier, (b) bridge girder, (c) building column, (d) building girder/beam, (e) tunnel, (f) viaduct, (g) pipeline, (h) dam, and (i) foundation, footing, or pile.

In accordance with another embodiment, the invention provides a system for detecting, visualizing, and reporting the near-surface condition of a multi-layer system to provide lifecycle predictive and damage alert capabilities, wherein the system includes a) normal incidence detection means for detecting the surface response of the structure and one or more of its structural components at a far-field distance with signal collection devices configured in normal incidence scheme for ISAR measurements; b) oblique incidence detection means for detecting the surface response of the structure and one or more of its structural components at a far-field distance with signal collection devices configured in oblique incidence scheme for ISAR measurements; c) means for data collection including one or more digital computers having a control program for acquiring and storing data from the normal incidence detecting means or the oblique incidence detecting means, and for optionally changing the operating characteristics of these detecting means; d) means for processing structural responses collected by the normal incidence detecting means or the oblique incidence detecting means using tomographic reconstruction methods, wherein the tomographic reconstruction methods further comprising a plurality of implementation algorithms for visualizing structural response for condition assessment; e) means for communicating with the data collection and processing systems; and f) a numerical program implementing tomographic reconstruction methods that processes, visualizes, and displays imagery representing structural condition.

In accordance with a further embodiment, the invention provides a system for detecting, visualizing, and reporting the near-surface condition of a multi-layer system to provide lifecycle predictive and damage alert capabilities comprising: a) normal incidence detecting means for detecting the surface response of the structure and one or more of its structural components at a far-field distance with signal collection devices configured in normal incidence scheme for ISAR measurements; b) data collection means for data collection including one or more digital computers having a control program for acquiring and storing data from the detecting means, and for optionally changing the operating characteristics of the detecting means; c) processing means for processing structural responses collected by detecting system using tomographic reconstruction methods, said tomographic reconstruction methods further comprising a plurality of implementation algorithms for visualizing structural response for condition assessment; d) communicating means for communicating with the data collection and processing systems; and e) a numerical program implementing tomographic reconstruction methods that processes, visualizes, and displays imagery representing structural condition.

In accordance with a further embodiment, the invention provides a system for detecting, visualizing, and reporting the near-surface condition of a multi-layer system to provide lifecycle predictive and damage alert capabilities in which the system includes a) oblique incidence detecting means for detecting the surface response of the structure and one or more of its structural components at a far-field distance with signal collection devices configured in oblique incidence scheme for ISAR measurements; b) data collection means for data collection including one or more digital computers having a control program for acquiring and storing data from the detecting means, and for optionally changing the operating characteristics of the detecting means; c) processing means for processing structural responses collected by detecting system using tomographic reconstruction methods, said tomographic reconstruction methods further comprising a plurality of implementation algorithms for visualizing structural response for condition assessment; d) communicating means for communicating with the data collection and processing systems; and e) a numerical program implementing tomographic reconstruction methods that processes, visualizes, and displays imagery representing structural condition.

In accordance with yet further embodiments, the detecting means for detecting may consist of one or more of the following signal generators: horn antennas, waveguides, and coaxial probes. The detecting means for detecting may consist of any combination of two or more of the following signal generators: horn antennas, waveguides, and coaxial probes. The detecting means for detecting may consist of one or more of the following signal generators: horn antennas, waveguides, and coaxial probes. The detecting means for detecting may consist of any combination of two or more of the following signal generators: horn antennas, waveguides, and coaxial probes. One or more of the detecting means may be battery powered or powered from an electrical mains. The processing means may include a digital computer, a microprocessor, a hard disk drive for data storage, a read only memory (RAM) for data storage, a flash memory for data storage, an erasable programmable read only memory (EPROM) drive for data storage, and/or a hard disk drive for data storage. The algorithm may be a backprojection algorithm or a fast backprojection algorithm, and may include a novelty filter, a matched filter, fuzzy logic for interpretation, Fourier transform analysis, and/or wavelet transform analysis. The communicating means for communicating with the data collection and processing systems may include one or more half-duplex communication channels, one or more full-duplex communication channels, one or more electrical cables, a wireless network, a mesh wireless network, a self-assembling wireless network, a phone network, a radio link, a cellular network, a CDMA or GSM cellular network, a satellite communications link, a computer network, the Internet, an optical network, or a combination of two or more of the following: electrical cables, phone line, wireless network, cellular network, radio link, satellite communications link, a computer network, the Internet, or an optical network.

Those skilled in the art will appreciate that numerous modifications and variations may be made to the above disclosed embodiments without departing from the spirit and scope of the invention.

What is claimed is:

1. A non-contact, far-field radar nondestructive testing (NDT) method capable of detecting at least one of defects, damages, and reinforcement conditions in near-surface region of multi-layer systems using monostatic inverse synthetic aperture radar (ISAR) measurements and applicable to various types of structural elements, the method comprising the steps of conducting far-field monostatic ISAR measurements, executing an imaging algorithm, and executing a progressive image focusing algorithm, wherein said progressive image focusing scheme includes signal processing with increasing frequency ranges and azimuth ranges to render reconstructed images with improved resolution.

2. The method of claim 1, wherein said at least one of defects, damages, and reinforcement conditions includes any of fiber reinforced polymer (FRP) delamination, FRP debonding from concrete substrate, sizeable air pockets trapped between FRP sheets and concrete substrate during manufacturing, and the extent of concrete cracking and crumbling.

3. The method of claim 1, wherein said multi-layer systems include any of reinforced concrete (RC), prestressed concrete (PC), concrete composite, steel composite, and masonry structures wrapped and/or bonded with fiber reinforced polymer (FRP) sheets/plates.

4. The method of claim 1, wherein said monostatic inverse synthetic aperture radar (ISAR) measurements include the far-field and/or near-field radar measurements collected with coinciding transmitter and receiver in normal incidence scheme, and oblique incidence scheme.

5. The method of claim 1, wherein said imaging algorithm includes tomographic reconstruction and back-projection analysis.

6. The method of claim 1, wherein said structural elements include any of bridge pier, bridge girder, building column, building girder or beam, tunnel, viaduct, pipeline, darn, and foundation, footing, or pile.

* * * * *